(12) United States Patent
Gort-Barten

(10) Patent No.: US 10,028,611 B2
(45) Date of Patent: Jul. 24, 2018

(54) COFFEE MACHINE

(71) Applicant: Alex Gort-Barten, Crawley (GB)

(72) Inventor: Alex Gort-Barten, Crawley (GB)

( * ) Notice: Subject to any disclaimer, the term of this patent is extended or adjusted under 35 U.S.C. 154(b) by 562 days.

(21) Appl. No.: 14/408,841

(22) PCT Filed: Jun. 24, 2013

(86) PCT No.: PCT/GB2013/000278
§ 371 (c)(1),
(2) Date: Dec. 17, 2014

(87) PCT Pub. No.: WO2013/190261
PCT Pub. Date: Dec. 27, 2013

(65) Prior Publication Data
US 2015/0135968 A1    May 21, 2015

(30) Foreign Application Priority Data

Jun. 22, 2012  (GB) .................................. 1211165.4
Feb. 14, 2013  (GB) .................................. 1302614.1

(51) Int. Cl.
*A47J 31/36* (2006.01)
*A47J 31/06* (2006.01)

(52) U.S. Cl.
CPC ....... *A47J 31/0642* (2013.01); *A47J 31/0647* (2013.01); *A47J 31/0668* (2013.01);
(Continued)

(58) Field of Classification Search
CPC ......................... A47J 31/3676; A47J 31/3695
(Continued)

(56) References Cited

U.S. PATENT DOCUMENTS 4,644,856 A    2/1987  Borgmann
5,472,719 A *  12/1995  Favre .................. A47J 31/0673
                                                  426/112
(Continued)

FOREIGN PATENT DOCUMENTS

EP    1 092 376 A2    4/2001
WO    97/43937 A1    11/1997
(Continued)

OTHER PUBLICATIONS

Intellectual Property Office of the United Kingdom, Search Report issued in related application GB1211165.4, dated Oct. 21, 2012.
(Continued)

*Primary Examiner* — Reginald L Alexander
(74) *Attorney, Agent, or Firm* — Stites & Harbison, PLLC; Terry L. Wright

(57) ABSTRACT

A filter holder for an espresso coffee machine comprising a handle (1) and an outer holder (2), which outer holder is adapted to receive a filter plate (8). The filter plate (8) comprises a plurality of upstanding elements such as truncated pyramids adapted to tear, in use, a surface of a coffee capsule. Between the pyramids a plurality of perforations allow passage of coffee from a capsule to a cup. The holder further comprising a retaining member, which retaining member is adapted to retain the capsule in position and to permit water or steam to be applied under pressure to a surface of the capsule remote from the surface adjacent to the filter plate, the water or steam penetrating the capsule surface to reach the coffee in the capsule.

6 Claims, 6 Drawing Sheets

(52) U.S. Cl.
CPC ....... *A47J 31/0673* (2013.01); *A47J 31/0684* (2013.01); *A47J 31/3676* (2013.01); *A47J 31/3695* (2013.01)

(58) Field of Classification Search
USPC ........................................ 99/295, 302 R, 323
See application file for complete search history.

(56) References Cited

U.S. PATENT DOCUMENTS

| | | | |
|---|---|---|---|
| 5,656,311 A * | 8/1997 | Fond | B65B 29/02 |
| | | | 426/112 |
| 6,026,732 A | 2/2000 | Kollep et al. | |
| 8,127,664 B2 * | 3/2012 | Nielsen | A47J 31/005 |
| | | | 99/295 |
| 8,844,428 B2 * | 9/2014 | Kollep | A47J 31/06 |
| | | | 99/295 |
| 2007/0272084 A1 | 11/2007 | Mandralis et al. | |
| 2008/0134901 A1 | 6/2008 | Cortese | |
| 2011/0162533 A1 * | 7/2011 | Fumagalli | A47J 31/0668 |
| | | | 99/295 |
| 2011/0308399 A1 * | 12/2011 | Jung | A47J 31/0668 |
| | | | 99/295 |

FOREIGN PATENT DOCUMENTS

| | | |
|---|---|---|
| WO | 2012/001115 A1 | 1/2012 |
| WO | 2013/079814 A1 | 6/2013 |

OTHER PUBLICATIONS

Intellectual Property Office of the United Kingdom, Search Report issued in related application GB1302614.1, dated Dec. 18, 2013.

* cited by examiner

COFFEE MACHINE

The invention relates to a coffee machine for making espresso coffee and in particular an adaptor to enable the coffee machine to be used with coffee capsules as well as loose coffee and ESE coffee pods.

Powered espresso machines are well known. The conventional espresso machine comprises a water chamber, a heating element adapted to heat the water, which is then pumped under pressure to a filter holder. The filter holder, sometimes called a portafilter, typically comprises a handle portion and a holder portion provided with two or three lugs that are adapted to engage in the installed position with the machine brewhead to where the water is pumped. The holder portion is adapted to receive a filter, which is usually a metal bowl with a number of perforations through its bottom. In use, the filter is filled with finely ground coffee and the water is forced through the coffee at the high pressure generated by the pump to produce the espresso coffee which is collected in a cup placed under the filter holder.

The classic coffee machine suffers from two potential drawbacks. The first drawback is that ground coffee starts to lose its freshness and flavor after a few days and so for the optimum espresso, the user will also need to have a coffee grinder. The other drawback is that the used espresso coffee has to be removed from the filter, which can lead to mess as the grinds are fine. The tamping of the coffee in the filter also affects the end result and many users over tamp the coffee.

This lead to the development of ESE coffee pods, which can be used in many espresso machines. Coffee pods are generally individually wrapped to maintain freshness and consist of a small pod made of a perforated filter paper which contains the coffee, which is packed to avoid the tamping issue. The pod is placed in the filter holder and then disposed of after use. Coffee pods are convenient but have to fit the filter holder and be placed correctly otherwise water can leak around the edge. ESE Pods are referred to as hard pods in contrast to soft pod systems operable at lower pressure which produce an inferior drink.

This in turn lead to the development of capsule machines. The coffee capsules for these machines are completely sealed. The capsule machines do not use the conventional filter holder. A capsule machine has a two part mechanism. The lower part receives the capsule and is provided with an extraction surface upon which the capsule rests. The upper part is provided with a locking lever which is used to make the upper and lower parts integral. In use, the upper part cuts the upper surface of the capsule to allow water to enter the capsule and percolate down through the capsule, where it exits through the lower surface of the capsule at multiple locations determined by the geometry of the extraction surface. An example of such a machine is disclosed in EP 0870457

Capsule machines have proved to be commercially very successful as they are very convenient to use and produce a consistent product. However, since the capsule machine is designed to work with a particular brand of capsule, the choice of coffee is limited to that offered by the machine manufacturer. Although capsules are convenient, many consumers are reluctant to tie themselves to a particular brand or already own a conventional espresso machine and do not want to purchase a new machine simply for the convenience of a capsule.

The present invention seeks to provide means to facilitate the use of coffee capsules in conventional espresso machines.

According to the invention there is provided a capsule holder for an espresso coffee machine, which holder is adapted to receive a filter, wherein the filter comprises a filter plate having a plurality of upstanding elements adapted to tear, in use, a surface of a coffee capsule, and a plurality of perforations adapted to allow passage of coffee from a capsule to a cup, the holder further comprising a retaining member, which retaining member is adapted to retain the capsule in position and to permit water to be applied under pressure to a surface of the capsule remote from the surface adjacent to the filter plate.

Preferably, the retaining member is pivotally mounted on the handle of the filter holder and can be raised from the operational position to facilitate the insertion of a capsule.

Preferably, wherein the retaining member engages with a flange on the capsule to retain the capsule in the desired position.

Preferably, the surface of the capsule remote from the surface of the capsule adjacent to he filter plate is perforated to facilitate the passage of water under pressure into the capsule.

In a preferred embodiment in which the filter holder is installed in a coffee machine, the surface of the capsule adjacent to the filter plate is torn at least in part due to pressure in the capsule The filter holder of the invention advantageously permits the use of capsules in a conventional espresso machine and so provides a machine that can use capsules, ESE coffee pods and loose coffee.

Exemplary embodiments of the invention will now be described with reference to the drawings, in which.

Figure 1:
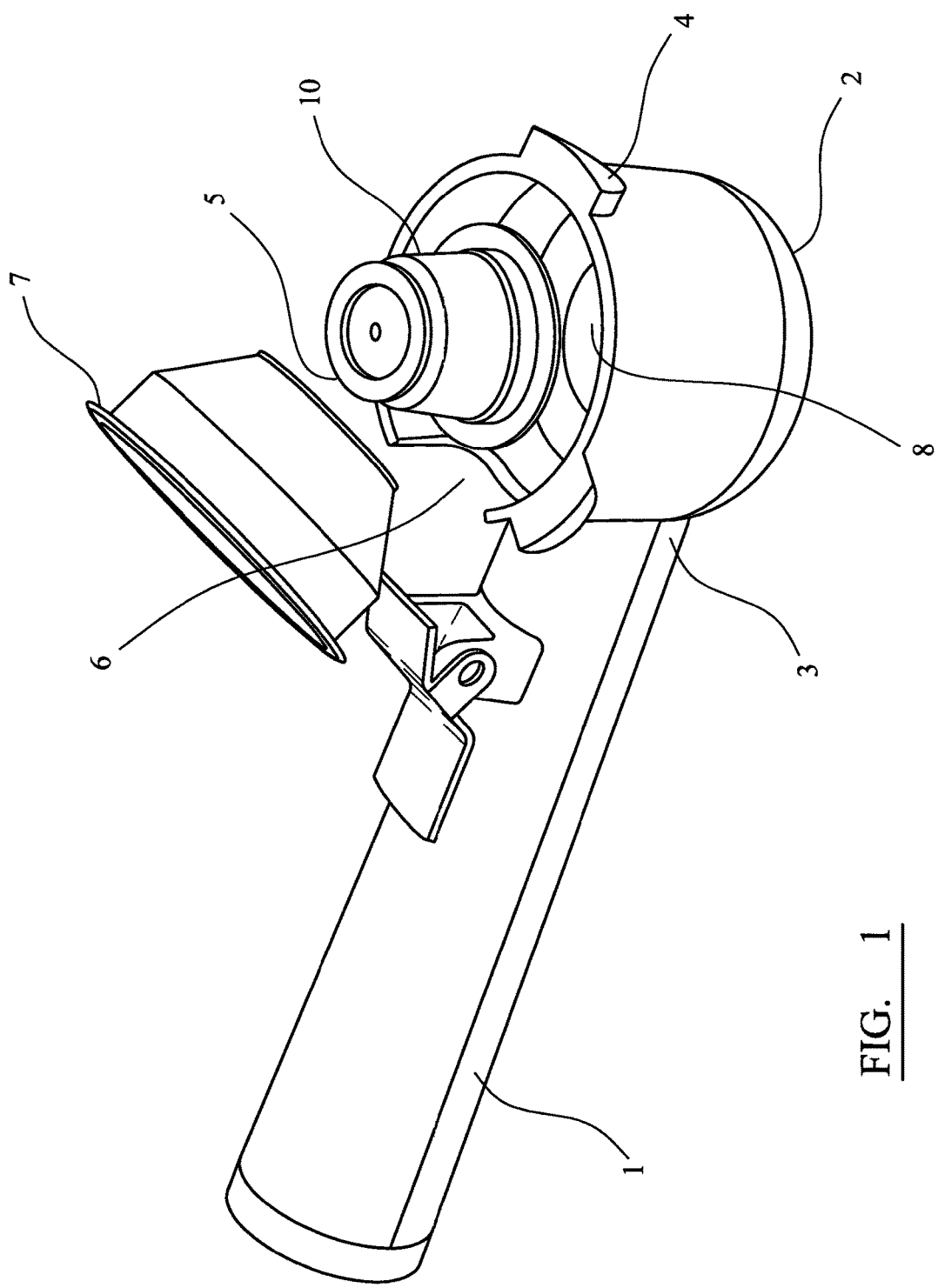
FIG. 1 shows an exploded view of a first filter holder
Figure 3:
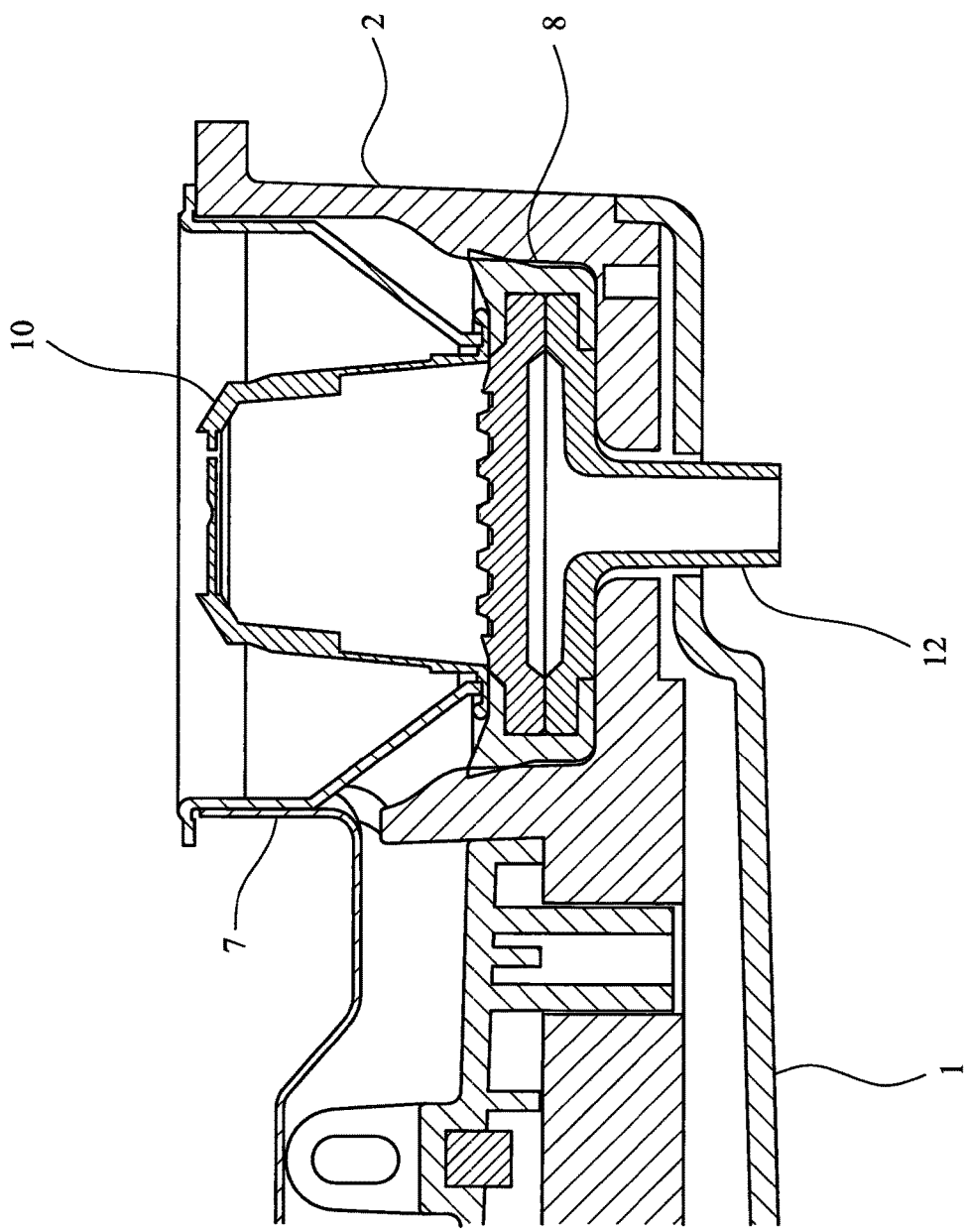
Figure 4:
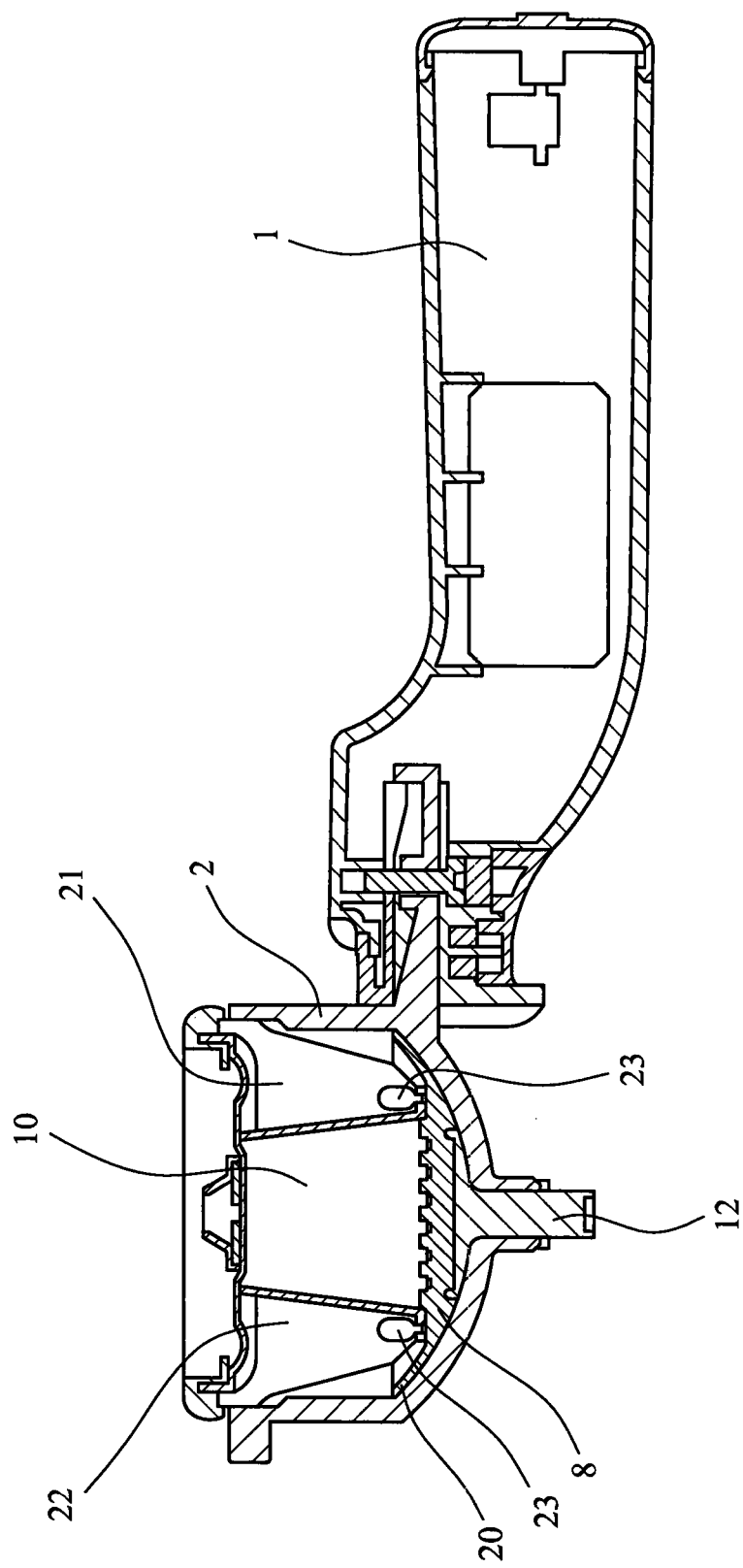
Figure 5:
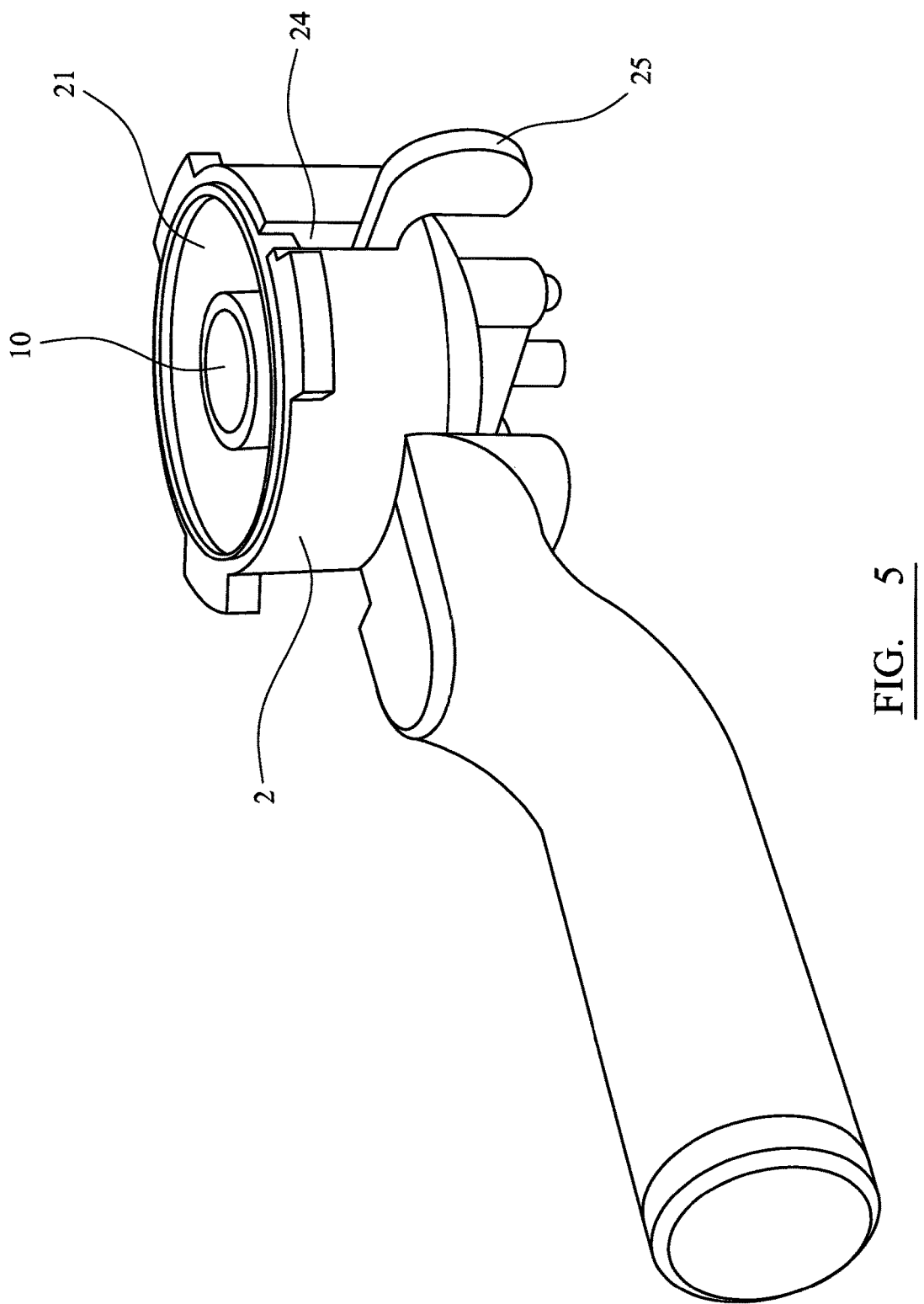
Figure 6:
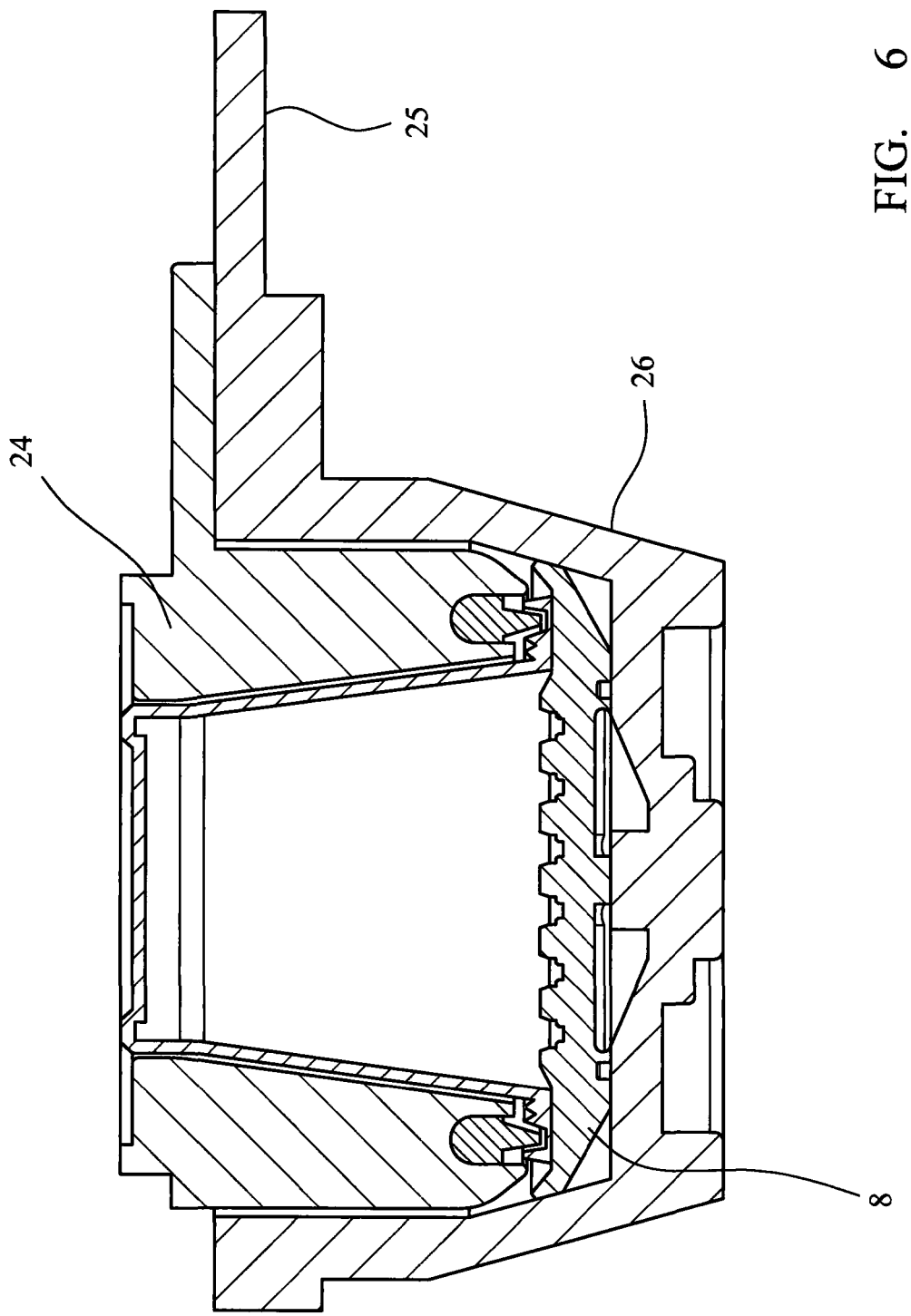

FIG. 3 shows the first filter holder in cross section in the operational position FIG. 4 shows a second embodiment in cross section FIG. 5 shows a perspective view of the second embodiment FIG. 6 shows a perspective view of a third embodiment for a pod machine FIG. 1 shows an exploded view of the filter holder comprising a handle portion 1 which is connected to an outer holder 2 having lugs 3, 4, 5. The outer holder has a cut-out 6 in the wall, which is upstanding from and adjacent to the handle portion 1. A retaining member 7 is pivotally mounted on an upper surface of the handle portion 1 and is adapted to pivot from a raised position as shown in FIG. 1 to a lowered position described in greater detail below. The retaining member has a generally cylindrical form which has an upper circular cross section and a lower truncated conical cross section. The two cross sections are dimensioned so as to fit within the outer holder 2 and to pass through and co-operate with the cut-out 6. A filter plate 8 comprising a plurality of upstanding truncated pyramids with perforations interstitial to the pyramids to permit coffee to flow out of the holder when in use is mounted in the outer holder.

The coffee capsule 10 comprises an inverted truncated cone and will generally have plastic or aluminium upstanding walls. The upper surface of the capsule is provided with a plurality of perforations around the circumference, with 9 perforations being particularly preferred. The lower face of the capsule comprises an aluminium foil. It has been surprisingly found that the perforations can be dimensioned such that they permit water under pressure to enter the capsule but do not lead to significant deterioration in the quality of the coffee.

Figure 2:
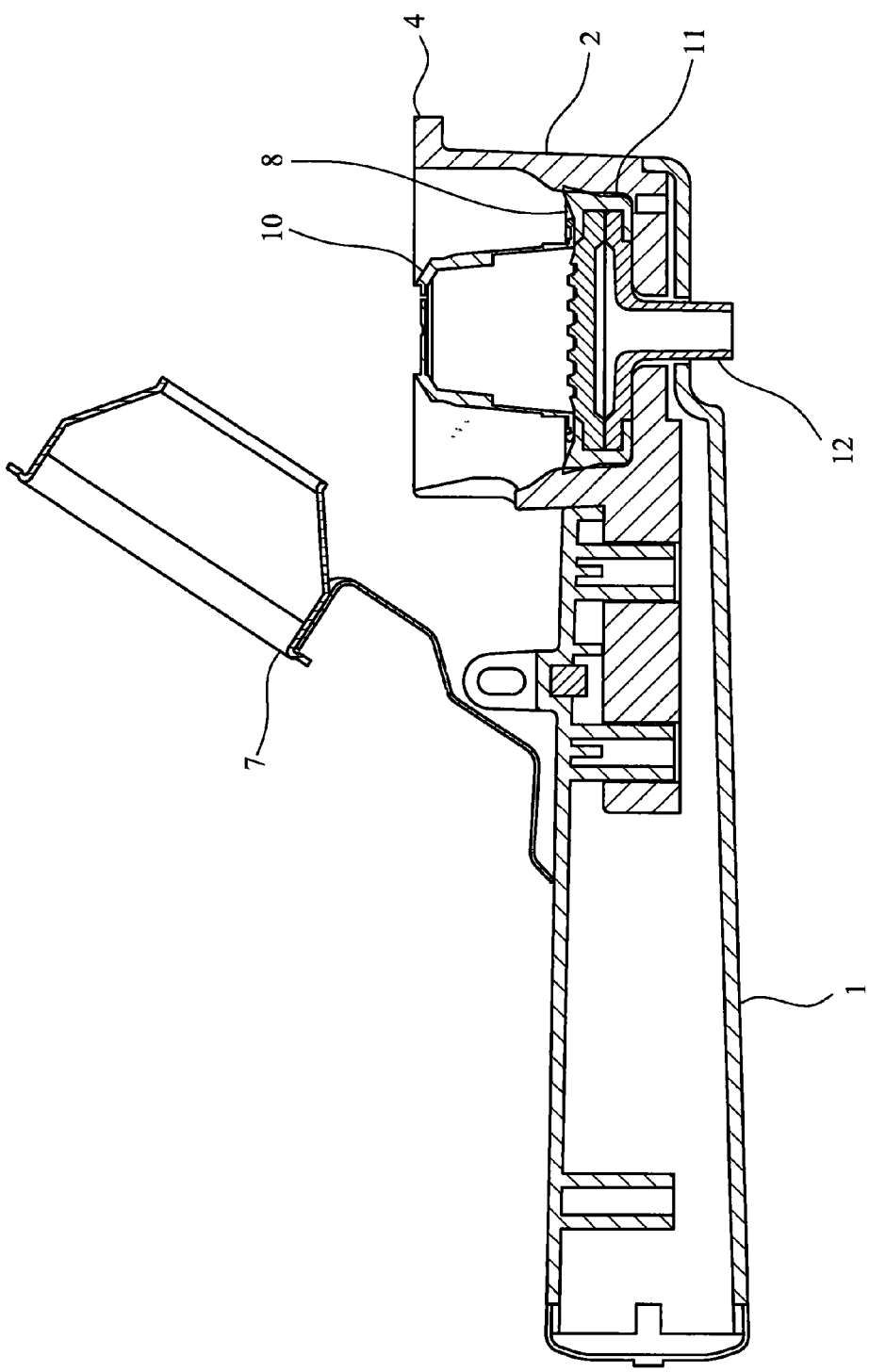
FIG. 2 shows a cross section through the first filter holder

FIG. 2 shows a cross section through the filter holder with the retaining member 7 in the raised position and the capsule 10 resting on the filter plate 8. FIG. 2 shows the profile of the lever arm of the retaining member 7, the proximal end of which is located perpendicular to the cylindrical wall of the retaining member. A short section of the lever is angled up towards the pivot point away from the plane of the proximal end. The lever then continues from the pivot point in a plane parallel to the proximal end. The distal end of the lever is then angled away from this plane so that in the raised position it is in the same plane as the handle portion 1 and thus can be easily held in position using a thumb or finger.

The filter plate 8 is shown here as a three part mechanism comprising the plate 8 with the upstanding pyramids and perforations, which is mounted in a mounting member 11, in which is also mounted a funnel member 12 for dispensing the coffee that has percolated through the filter plate into a cup. The mounting member 11 ensures that the plate is mounted in a sealing fashion in the outer holder 2 and prevents water from escaping around the edge of the filter plate, which could otherwise dilute the espresso. It has been found that the square pyramidal elements on the plate provide a good crema on the espresso.

FIG. 3 shows the retaining member lowered and in the operational state. The edge of the lower wall of the retaining member 7 engages with the rim of the coffee capsule 10 thus holding the capsule in the central position. The upper edge of the retaining member rests on the upper surface of the outer holder 2, with the flanged edge of the retaining member sitting inside the outer circumference of the outer holder. The retaining member material at this point is sufficiently thin that the holder can still fit in the coffee machine. The holder can then be inserted in the coffee machine in the conventional manner and the capsule is retained in the correct position below the water outlet.

FIG. 4 shows an alternative embodiment to that of FIG. 1. The filter holder comprises the handle portion 1 which is connected to an outer holder 2 having lugs of which only one is visible in the cross section. The filter plate 8 comprising the upstanding truncated pyramidal structure is supported on the lower part of interior wall of the outer holder 2 and is provided with a raised lip 20, the upper edge of which is located in a plane higher than the plane of the upper surface of the truncated pyramidal structure. A funnel 12 is located beneath the filter plate to provide the outlet for the coffee.

The capsule 10 rests on the surface of the upstanding truncated pyramidal structure 8. A retaining member 21 is adapted to engage with capsule 10 to retain the capsule in position in use. The retaining member 21 comprises a trapezoidal or truncated conical structure having a central opening adapted to engage with and positively retain the capsule in the installed position. The retaining member 21 has a rim 22, which rim is adapted to engage in a sealing fashion with the brewhead and the interior wall of the outer holder 2 adjacent to the brewhead in the installed position. A seal 23 is provided to ensure that there is a good seal between the exit surface of the capsule and the retaining member 21. The seal is also adapted to facilitate the use of different capsule designs by providing for some compensation in the retaining position. The seal may be made of silicone.

FIG. 5 shows a perspective view of the filter holder with the retaining member 21 in position retaining a capsule 10 in position. The outer holder 2 has a slot 24 cut from the upper edge, which slot 24 is adapted to receive a handle 25 formed on the retaining member 21. The handle allows for easy removal of the capsule from the holder. The retaining member 21 can be made from an insulating plastic such as glass fibre re-inforced polyamide, so that it can be touched when the capsule is still hot.

In use, the espresso machine is then turned on and water is applied under pressure to the perforated capsule end. Due to the pressure of the water, which will typically be 9 to 14 bar, the water enters the capsule and the pressure of the water causes the aluminium foil on the bottom of the capsule to tear against the truncated pyramids on the filter plate 8 by pushing the foil onto the pyramids. The coffee that is extracted by the water can then percolate through the capsule and out of the perforations between the truncated pyramids on the filter plate.

FIG. 6 shows a perspective view of a third embodiment for a pod machine. Coffee machines which are adapted to use ESE coffee pods are well known in the market. In a development of the second embodiment, the holder can also be used in a pod machine. The capsule holder comprises a lower portion 26 comprising the filter plate 8 and an upper portion which is hingedly connected to the lower portion and provided with a handle 25. The upper portion comprises a retaining member 29 that is similar to the retaining member 21. In use, a coffee capsule is inserted in the retaining member 29 with the pre-perforated end facing away from the pyramid plate 8. The user then closes the adaptor so that the tearable capsule surface abuts the pyramid plate. The adaptor is then placed in the pod machine and water is free to be applied to the pre-perforated face of the capsule. This will then burst under pressure and pressure will build up in the capsule. This in turn will result in the capsule surface tearing on the pyramid plates so that coffee formed by the entry of the heated water under pressure can flow out in the same manner as with a pod. Alternatively, the lower and upper portions need not be hingedly connected.

The invention claimed is:

1. A coffee machine, comprising:
   a brewhead;
   a filter holder having a handle (1) and an outer holder (2), which outer holder is adapted to receive a filter, wherein the filter comprises a filter plate (8) having a plurality of upstanding elements adapted to tear, in use, a surface of a coffee capsule (10), and a plurality of perforations adapted to allow passage of coffee from a capsule to a cup, the holder further comprising a retaining member (21), which retaining member is adapted to retain the capsule (10) in position and to permit hot water or steam to be applied under pressure to a surface of the capsule remote from the surface adjacent to the (8), and which retaining member includes
      a trapezoidal or truncated conical structure having a central opening adapted to engage the capsule adjacent the filter plate and positively retain the capsule in an extraction position, and
      a rim adapted to engage in a sealing fashion with the brewhead and with an interior wall of the outer holder (2) adjacent the brewhead in an extraction position; and
   a coffee capsule, wherein the retaining member (21) engages with a flange on the capsule to retain the capsule in the desired position, and
   wherein the retaining member is pivotally mounted on the handle of the filter holder and can be raised from the operational position to facilitate the insertion of a capsule.

2. The coffee machine according to claim 1, wherein the surface of the capsule remote from the surface of the capsule adjacent to the filter plate is perforated or provided with a zone of weakness to facilitate the passage of water under pressure into the capsule.

3. The coffee machine according to claim 2, wherein the surface of the capsule adjacent to the filter plate is torn at least in part due to pressure in the capsule.

4. A filter holder for an espresso coffee machine having a brewhead, the filter holder comprising a handle (1) and an outer holder (2), which outer holder is adapted to receive a filter, wherein the filter comprises a filter plate (8) having a plurality of upstanding elements adapted to tear, in use, a surface of a coffee capsule (10), and a plurality of perforations adapted to allow passage of coffee from a capsule to a cup, the holder further comprising a retaining member (21), which retaining member is adapted to retain the capsule (10) in position and to permit hot water or steam to be applied under pressure to a surface of the capsule remote from the surface adjacent to the filter plate (8), and which retaining member includes
- a trapezoidal or truncated conical structure having a central opening adapted to engage the capsule adjacent the filter plate and positively retain the capsule in an extraction position, and
- a rim adapted to engage in a sealing fashion with the brewhead and with an interior wall of the outer holder (2) adjacent the brewhead in an extraction position, wherein the retaining member is pivotally mounted on the handle of the filter holder and can be raised from the operational position to facilitate the insertion of a capsule.

5. The filter holder according to claim 4, wherein a seal (23) is provided to ensure that there is a good seal between an exit surface of the capsule and the retaining member (21), which seal is adapted to facilitate the use of different capsule designs.

6. A filter holder for an espresso coffee machine having a brewhead, the filter holder comprising a handle (1) and an outer holder (2), which outer holder is adapted to receive a filter, wherein the filter comprises a filter plate (8) having a plurality of upstanding elements adapted to tear, in use, a surface of a coffee capsule (10), and a plurality of perforations adapted to allow passage of coffee from a capsule to a cup, the holder further comprising a retaining member (21), which retaining member is adapted to retain the capsule (10) in position and to permit hot water or steam to be applied under pressure to a surface of the capsule remote from the surface adjacent to the filter plate (8), and which retaining member includes
- a trapezoidal or truncated conical structure having a central opening adapted to engage the capsule adjacent the filter plate and positively retain the capsule in an extraction position, and
- a rim adapted to engage in a sealing fashion with the brewhead and with an interior wall of the outer holder (2) adjacent the brewhead in an extraction position, wherein the outer holder comprises a plurality of lugs (3) adapted to engage with a brewhead on an espresso machine, the outer holder further comprising a cut out (24) adapted to co-operate with the retaining member in the operational position so that the interior of the outer holder and retaining member remains substantially pressure tight when water is pumped through by the espresso machine.

* * * * *